US011907552B2

United States Patent
Wang et al.

(10) Patent No.: US 11,907,552 B2
(45) Date of Patent: Feb. 20, 2024

(54) METHOD, ELECTRONIC DEVICE AND COMPUTER PROGRAM PRODUCT FOR EXTENDING STORAGE SYSTEM

(71) Applicant: Dell Products L.P., Round Rock, TX (US)

(72) Inventors: Sheng Wang, Beijing (CN); Dapeng Chi, Beijing (CN); Wen Jiang, Beijing (CN); Yang Song, Beijing (CN); Yi Wang, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/890,338

(22) Filed: Aug. 18, 2022

(65) Prior Publication Data

US 2023/0236746 A1 Jul. 27, 2023

(30) Foreign Application Priority Data

Jan. 21, 2022 (CN) .......................... 202210071907.1

(51) Int. Cl.
*G06F 3/06* (2006.01)
(52) U.S. Cl.
CPC .......... *G06F 3/0631* (2013.01); *G06F 3/0604* (2013.01); *G06F 3/0689* (2013.01)
(58) Field of Classification Search
CPC ..... G06F 3/0631; G06F 3/0604; G06F 3/0689
See application file for complete search history.

(56) References Cited

U.S. PATENT DOCUMENTS

| 10,430,279 | B1 | 10/2019 | Dittia et al. | |
|---|---|---|---|---|
| 10,852,966 | B1 | 12/2020 | Liu et al. | |
| 11,461,023 | B1 | 10/2022 | Li et al. | |
| 2002/0152416 | A1* | 10/2002 | Fukuda | G06F 3/0634 711/170 |
| 2009/0287880 | A1* | 11/2009 | Wright | G06F 11/2094 714/6.22 |
| 2013/0297905 | A1* | 11/2013 | Yang | G06F 3/0647 711/165 |
| 2018/0067660 | A1* | 3/2018 | Yamamoto | G06F 3/0641 |
| 2022/0107729 | A1 | 4/2022 | Hua | |

\* cited by examiner

*Primary Examiner* — Edward J Dudek, Jr.
(74) *Attorney, Agent, or Firm* — BainwoodHuang (57) ABSTRACT

Techniques for extending a storage system having a first pool involve adding, in response to a request, second storage devices, wherein the first pool is generated using first storage devices and based on a first standard. The first pool includes first stripes created using the first standard, and the number of the second storage devices equals a first stripe width associated with the first standard. Such techniques further involve creating a second pool using the second storage devices and based on a second standard, wherein a second stripe width associated with the second standard equals the first stripe width. Such techniques further involve creating second stripes in the second pool using the second storage devices and based on the second standard. Such techniques further involve storing data of at least one of the first stripes to a corresponding stripe of the second stripes according to a data shuffle rule.

16 Claims, 4 Drawing Sheets

METHOD, ELECTRONIC DEVICE AND COMPUTER PROGRAM PRODUCT FOR EXTENDING STORAGE SYSTEM

CROSS-REFERENCE TO RELATED APPLICATION

This application claims priority to Chinese Patent Application No. CN202210071907.1, on file at the China National Intellectual Property Administration (CNIPA), having a filing date of Jan. 21, 2022, and having "METHOD, ELECTRONIC DEVICE AND COMPUTER PROGRAM PRODUCT FOR EXTENDING STORAGE SYSTEM" as a title, the contents and teachings of which are herein incorporated by reference in their entirety.

TECHNICAL FIELD

Embodiments of the present disclosure relate to the field of computers and, more particularly, to a method, an electronic device, an apparatus, a medium, and a computer program product for extending a storage system.

BACKGROUND

With the development of data storage technologies, a variety of data storage systems based on a Redundant Array of Independent Disks (RAID) have been developed, which improves data reliability. One of them is Mapped RAID, in which disk is a logical concept and may include a plurality of extents. A plurality of extents included in a logical disk may be distributed on different physical storage devices in a resource pool of a storage system. For a plurality of extents in a stripe of one mapped RAID, the plurality of extents should be distributed on different physical storage devices. Shuffle operations need to be performed to balance the usage load of each storage device, for example, shuffling between existing storage devices and newly added storage devices. Conventional methods of shuffling data are slow in speed and cannot improve the access bandwidth of storage devices. Therefore, there is a need for a method that can simplify the shuffle operation and increase the access bandwidth of storage devices.

SUMMARY OF THE INVENTION

Embodiments of the present disclosure provide a method, an electronic device, an apparatus, a medium, and a computer program product for extending a storage system.

According to a first aspect of the present disclosure, a method for extending a storage system is provided. This method includes adding, in response to receiving a request to extend the storage system having a first storage resource pool, a second plurality of storage devices to the storage system, wherein the first storage resource pool is generated using a first plurality of storage devices and based on a first storage array standard, the first storage resource pool includes a first plurality of stripes created using the first storage array standard, and the number of the second plurality of storage devices is equal to a first stripe width associated with the first storage array standard. The method further includes creating a second storage resource pool using the second plurality of storage devices and based on a second storage array standard, wherein a second stripe width associated with the second storage array standard is equal to the first stripe width. The method further includes creating a second plurality of stripes in the second storage resource pool using the second plurality of storage devices and based on a second storage array standard. The method further includes storing data of at least one stripe of the first plurality of stripes to a corresponding stripe of the second plurality of stripes according to a data shuffle rule.

According to a second aspect of the present disclosure, an electronic device is also provided. The electronic device includes a processor and a memory coupled to the processor, and the memory has instructions stored therein which, when executed by the processor, cause the device to perform actions. The actions include adding, in response to receiving a request to extend the storage system having a first storage resource pool, a second plurality of storage devices to the storage system, wherein the first storage resource pool is generated using a first plurality of storage devices and based on a first storage array standard, the first storage resource pool includes a first plurality of stripes created using the first storage array standard, and the number of the second plurality of storage devices is equal to a first stripe width associated with the first storage array standard. The actions further include creating a second storage resource pool using the second plurality of storage devices and based on a second storage array standard, wherein a second stripe width associated with the second storage array standard is equal to the first stripe width. The actions further include creating a second plurality of stripes in the second storage resource pool using the second plurality of storage devices and based on a second storage array standard. The actions further include storing data of at least one stripe of the first plurality of stripes to a corresponding stripe of the second plurality of stripes according to a data shuffle rule.

According to a third aspect of the present disclosure, an apparatus for extending a storage system is provided. The apparatus includes a storage device addition module configured to add, in response to receiving a request to extend the storage system having a first storage resource pool, a second plurality of storage devices to the storage system, wherein the first storage resource pool is generated using a first plurality of storage devices and based on a first storage array standard, the first storage resource pool includes a first plurality of stripes created using the first storage array standard, and the number of the second plurality of storage devices is equal to a first stripe width associated with the first storage array standard. The apparatus further includes a storage resource pool creation module configured to create a second storage resource pool using the second plurality of storage devices and based on a second storage array standard, wherein a second stripe width associated with the second storage array standard is equal to the first stripe width. The apparatus further includes a stripe creation module configured to create a second plurality of stripes in the second storage resource pool using the second plurality of storage devices and based on the second storage array standard. The apparatus further includes a data shuffle module configured to store data of at least one stripe of the first plurality of stripes to a corresponding stripe of the second plurality of stripes according to a data shuffle rule.

According to a fourth aspect of the present disclosure, a computer-readable storage medium is provided, which includes machine-executable instructions that, when executed by a device, cause the device to perform the method according to the first aspect of the present disclosure.

According to a fifth aspect of the present disclosure, a computer program product is provided. The computer program product is tangibly stored on a computer-readable medium and includes machine-executable instructions which, when executed by a device, cause the device to perform the method according to the first aspect.

The Summary of the Invention part is provided to introduce the selection of concepts in a simplified form, which will be further described in the Detailed Description below. The Summary of the Invention part is neither intended to identify key features or essential features of the claimed subject matter, nor intended to limit the scope of the claimed subject matter.

BRIEF DESCRIPTION OF THE DRAWINGS

The above and other features, advantages, and aspects of embodiments of the present disclosure will become more apparent in conjunction with the accompanying drawings and with reference to the following detailed description. In the accompanying drawings, identical or similar reference numerals represent identical or similar elements, in which.

In all the accompanying drawings, identical or similar reference numerals indicate identical or similar elements.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on. Embodiments of the present disclosure will be described in more detail below with reference to the accompanying drawings. Although the accompanying drawings show some embodiments of the present disclosure, it should be understood that the present disclosure can be implemented in various forms and should not be interpreted as being limited to the embodiments described herein. Instead, these embodiments are provided to enable a more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and similar terms thereof should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or the same objects. Other explicit and implicit definitions may also be included below.

In addition, all specific values herein are examples, which are intended only to aid understanding and are not intended to limit the scope in any way.

Figure 1:
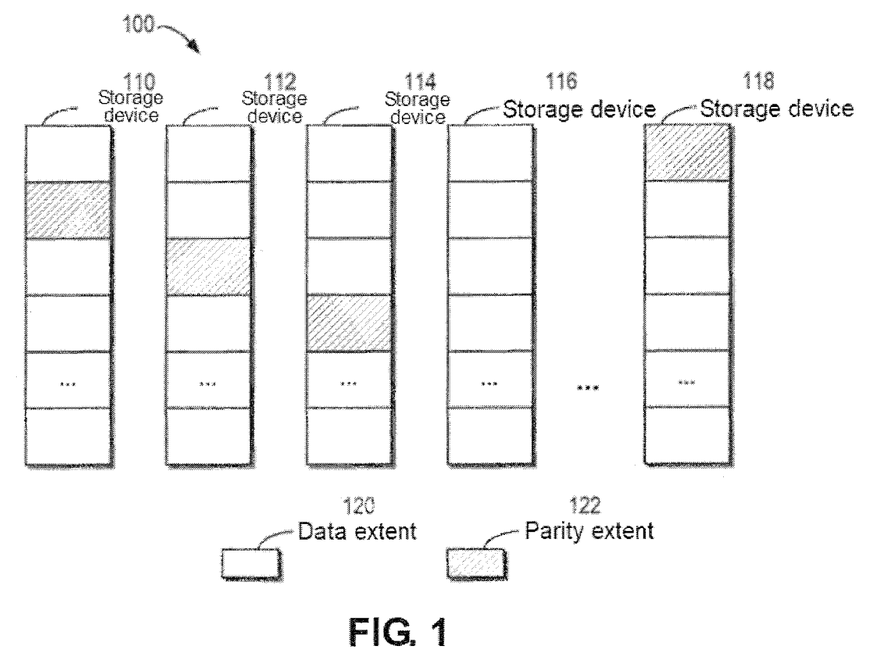
FIG. 1 schematically illustrates a block diagram of a storage system in which an example implementation according to the present disclosure can be implemented.

FIG. 1 schematically illustrates a block diagram of storage system 100 in which an example implementation according to the present disclosure can be implemented. As shown in FIG. 1, storage system 100 may include a plurality of storage devices 110, 112, 114, 116, . . . , and 118. Each storage device may include a plurality of extents, and the plurality of extents can be managed based on a mapped RAID. A storage resource pool can be created based on a predetermined storage array standard. For example, when using a 4D+1P (4 extents for data storage and 1 extent for parity storage) RAID standard, one stripe can be created using 5 extents respectively located on 5 storage devices. At this point, 4 extents in the stripe may be used to store data (as shown by legend 120), and 1 extent may be used to store parity (as shown by legend 122).

As the storage system runs, available storage space in the storage system will gradually be exhausted. At this point, new storage devices can be added to the storage system to extend the storage space of the storage system. Various technical solutions have been proposed for extending storage devices. In one technical solution, one or more new storage devices can be added to a storage system. To ensure load balancing across storage devices, it is necessary to perform a shuffle operation among existing storage devices and the new storage devices in the storage system to migrate data from storage devices with high usage loads to the new storage devices. However, for a large storage system, the shuffle operation will last for several days or even longer, which will seriously degrade the user experience of the storage system.

In another technical solution, a plurality of storage systems of which the number exceeds a predetermined number (e.g., the width of stripes in a storage system) can be added to the storage system. For example, in a 4D+1P storage system, 4+1=5 storage devices can be added to the storage system. At this point, the newly added 5 storage devices can form a new mapped RAID and can immediately provide data storage services to users of the storage system.

To address the shortcomings in existing technical solutions, example implementations of the present disclosure propose a technical solution for extending a storage system. Hereinafter, an overview of an example implementation according to the present disclosure will be described with reference to FIG. 2. For the convenience of description, only a storage system including 5 storage devices and built based on a 4D+1P RAID standard will be used as an example below to describe the process of extending a storage system. According to an example implementation of the present disclosure, the storage system may also include more or fewer storage devices, and this storage system may be built based on other storage array standards.

Figure 2:
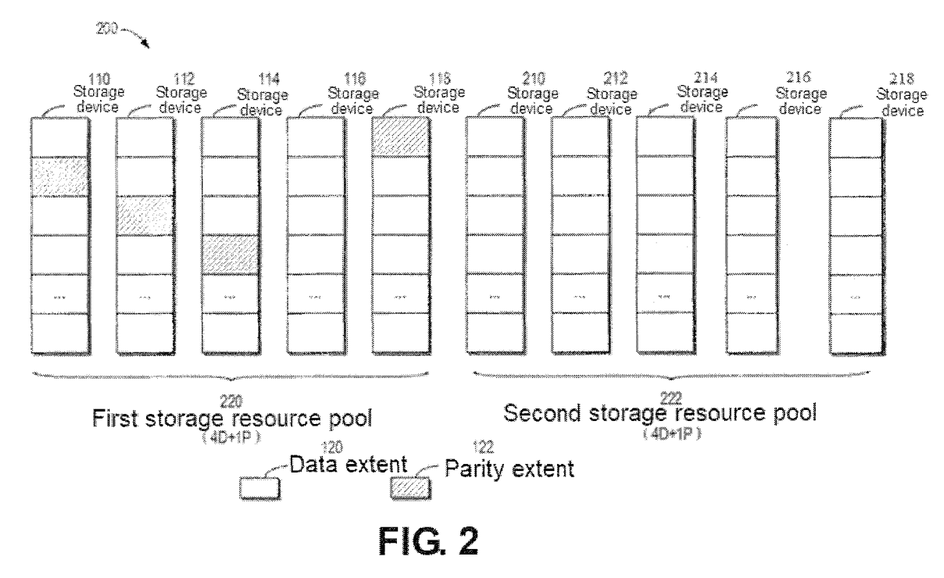
FIG. 2 schematically illustrates a block diagram for extending a storage system according to an example implementation of the present disclosure.

FIG. 2 schematically illustrates block diagram 200 for extending a storage system according to an example implementation of the present disclosure. Prior to the extending operation, the storage system includes a first plurality of storage devices (the example of FIG. 2 includes 5 storage devices 110, 112, 114, 116, and 118). The storage devices form first storage resource pool 220 based on a first storage array standard (the 4D+1P RAID standard). A second plurality of storage devices (the example of FIG. 2 includes 5 storage devices 210, 212, 214, 216, and 218) may be added to the storage system.

Second storage resource pool 222 may be generated using the above-mentioned storage devices 210, 212, 214, 216, and 218 and based on a second storage array standard (e.g., the 4D+1P RAID standard). At this point, the number of the second plurality of storage devices, i.e., 5, is equal to a first stripe width associated with the first storage array standard. It can be understood that the number of the second plurality of storage devices may also be other numbers, and thus the second storage array standard may also change.

It will be understood that since second storage resource pool 222 is a complete mapped RAID storage system, it can immediately serve a data access request from a user of the storage system. For example, when the storage system receives a request from a user to write user data to the storage system, it can immediately write the user data to second storage resource pool 222 without performing a shuffle operation. In this manner, the storage space in the added storage devices can be used immediately after the new storage devices are added without performing a shuffle operation for each storage device in the storage system or adding a large number of storage devices to the storage system at one time.

Figure 3:
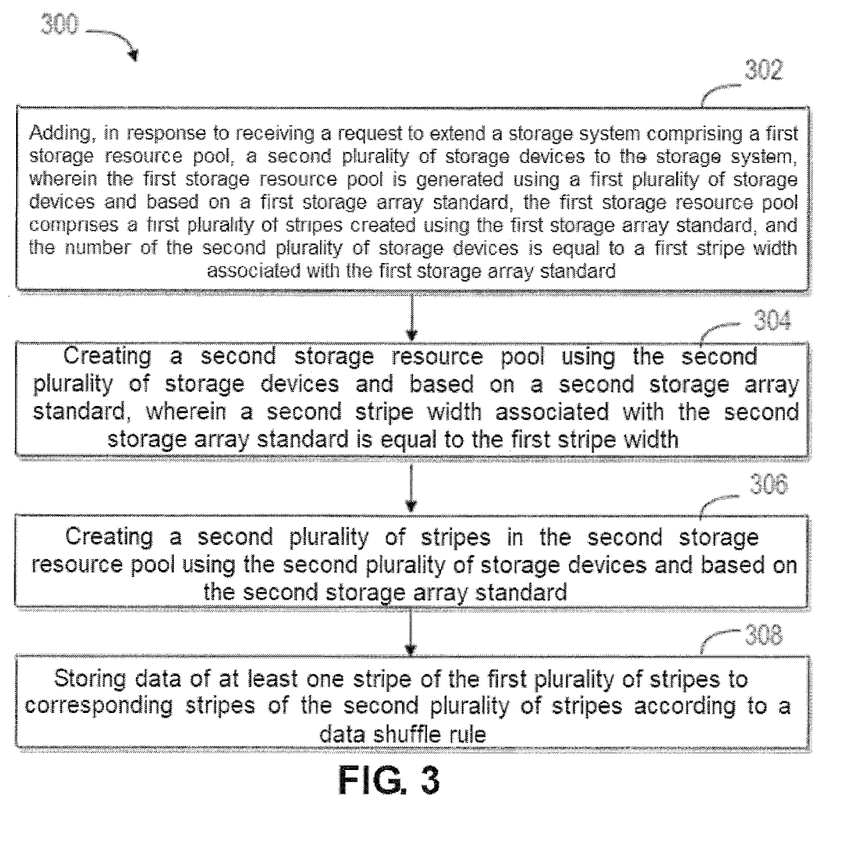
FIG. 3 schematically illustrates a flow chart of a method for extending a storage system according to an example implementation of the present disclosure.

FIG. 3 schematically illustrates a flow chart of method 300 for extending a storage system according to an example implementation of the present disclosure. As shown in the figure, the storage system includes first storage resource pool 220, and first storage resource pool 220 is generated using a first plurality of storage devices and based on a first storage array standard.

At block 302, a second plurality of storage devices are added to the storage system in response to receiving a request to extend the storage system having a first storage resource pool, wherein the first storage resource pool is generated using the first plurality of storage devices and based on the first storage array standard, the first storage resource pool includes a first plurality of stripes created using the first storage array standard, and the number of the second plurality of storage devices is equal to a first stripe width associated with the first storage array standard.

The request to extend the storage system may be received in the storage system. According to an example implementation of the present disclosure, the extending request can be issued automatically when it is detected that idle storage space included in the storage system is below a predetermined threshold. Alternatively and/or additionally, the extending request can be issued manually by an administrator of the storage system. Method 300 according to an example implementation of the present disclosure can be triggered by the extending request.

At block 304, second storage resource pool 222 is created using the second plurality of storage devices and based on a second storage array standard, a second stripe width associated with the second storage array standard being equal to the first stripe width.

The second plurality of storage devices may be added to the storage system if the extending request is received. Here, the number of the second plurality of storage devices is equal to the first stripe width associated with the first storage array standard. It will be understood that the number of the second plurality of storage systems here should be greater than or equal to 5, as the number of the first plurality of storage devices is 5 (the example of FIG. 2 includes 5 storage devices).

At block 306, a second plurality of stripes are created in the second storage resource pool using the second plurality of storage devices and based on the second storage array standard. Here, a second stripe width associated with the second storage array standard is equal to the first stripe width. In the example shown in FIG. 2, the first stripe width is 5 and the second stripe width is also 5. At this point, second storage resource pool 222 can be created based on extents in storage devices 210, 212, 214, 216, and 218 and based on the 4D+1P RAID standard. With the example implementation of the present disclosure, once storage devices 210, 212, 214, 216, and 218 have been added to the storage system, idle space in those storage devices can be used. In this manner, the impact of the extending operation and the subsequent shuffle operation on the performance of the storage system can be reduced, and thus more available storage space can be obtained at a higher speed.

At block 308, data of at least one stripe of the first plurality of stripes is stored to a corresponding stripe of the second plurality of stripes according to a data shuffle rule.

According to an example implementation of the present disclosure, the shuffle operation can be triggered automatically when an imbalance in usage loads of the storage system is detected, the shuffle operation can be triggered periodically, or the shuffle operation can be triggered manually by an administrator of the storage system.

In this way, with the example implementation of the present disclosure, the storage space in the newly added storage devices can be used immediately without interrupting the normal data storage service of the storage system to perform the shuffle operation. Also in this manner, the access speed of the storage system can be increased, so that the I/O access capability of the newly added storage devices can be connected to the entire storage system.

Figure 4:
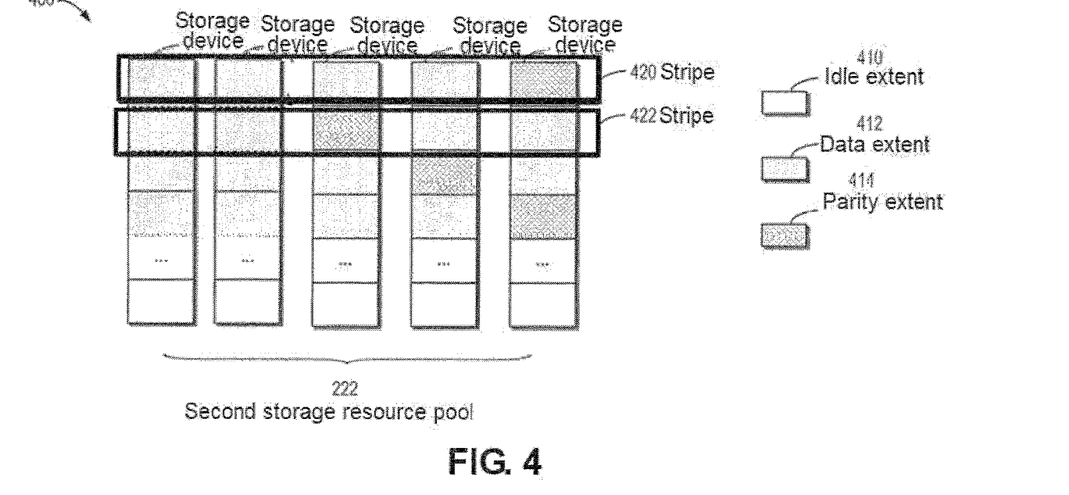
FIG. 4 schematically illustrates a block diagram for generating a second storage resource pool according to an example implementation of the present disclosure.

FIG. 4 schematically illustrates block diagram 400 for generating a second storage resource pool according to an example implementation of the present disclosure. Hereinafter, more details of the generation of second storage resource pool 222 will be described with reference to FIG. 4. As shown in FIG. 4, stripes in second storage resource pool 222 can be created using extents located at storage devices 210, 212, 214, 216, and 218, respectively, and based on the 4D+1P RAID standard.

According to an example implementation of the present disclosure, each stripe can span the plurality of storage devices 210, 212, 214, 216, and 218. By way of example only, in stripe 420, the extents in storage devices 210, 212, 214, 216 are data extents and the extents in storage device 218 are parity extents. At this point, the distribution of the data extents and the parity extent of each stripe satisfies the 4D+1P RAID standard. It will be understood that although FIG. 4 only schematically illustrates two stripes 420 and 422, second storage resource pool 222 may also include more or fewer stripes.

According to an example implementation of the present disclosure, if a request to write user data to the storage system is received, the user data can be written to at least one stripe in second storage resource pool 222. According to an example implementation of the present disclosure, the user data can be divided based on sizes of extents in second storage resource pool 222, and the divided user data can be stored to one or more stripes in second storage resource pool 222.

Specifically, data portions and parity portions that are associated with the user data can be generated based on the second storage array standard. Further, the data portions and the parity portions can be written to data extents and parity extents, respectively, in the at least one stripe. For example, the user data can be divided into two portions, and the above two portions can be stored respectively to two data extents in stripe 420. Subsequently, a corresponding parity portion can be generated based on the two data extents, and this parity portion can be stored to the parity extent in stripe 420.

It will be understood that the above only schematically illustrates the situation where user data is stored in one stripe, and when the amount of the user data is large, the user data can be stored in more stripes. For example, when the size of the user data is 4 times the size of the data extents, the user data can be divided into 4 portions, and the above 4 portions can be respectively stored to data extents in stripe 420 and stripe 422. With the example implementation of the present disclosure, the RAID standard of second storage resource pool 222 is equal to the RAID standard of first storage resource pool 220 at this time, and second storage resource pool 222 can operate as an independent RAID storage system. It can be understood that the RAID standard in second storage resource pool 222 is not equal to the RAID standard in first storage resource pool 220, and second storage resource pool 222 may also operate as an independent RAID storage system. In this manner, the storage space in second storage resource pool 222 can be used immediately without performing a shuffle operation. The storage system can provide hybrid RAID storage, and the downtime of the storage system can be reduced, and the performance of the storage system can be improved while ensuring data reliability.

In some embodiments, in response to determining that data in the at least one stripe has been stored, corresponding storage space in the first storage resource pool is identified as available storage space in the storage system.

By way of example, if data in the stripes in storage devices 110, 112, 114, 116, and 118 has been stored (alternatively, it may be referred to as migrated) to stripe 420 or stripe 422, the corresponding storage space of the first storage resource pool is accordingly identified as available storage space of the storage system.

In some embodiments, the data in the at least one stripe is released in response to determining that the corresponding storage space is identified as available storage space. In this way, the corresponding space of the first storage device can be reused. In this way, the storage system can be made to have more storage space for storing user data.

In some embodiments, the storing data of at least one of the first plurality of stripes to a corresponding stripe of the second plurality of stripes includes determining, based on the first storage array standard, a first plurality of extents of at least one stripe of the first plurality of stripes, wherein the number of the first plurality of extents is equal to the number of the first plurality of storage devices; further includes determining, based on the second storage array standard, a second plurality of extents of at least one stripe of the second plurality of stripes, wherein the number of the second plurality of extents is equal to the number of the second plurality of storage devices; and further includes storing data of the first plurality of extents to the second plurality of extents according to the data shuffle rule.

In some embodiments, the data shuffle rule includes determining a third plurality of stripes among the first plurality of stripes, wherein the number of the third plurality of stripes is half the number of the first plurality of stripes; and storing data in the third plurality of stripes to corresponding stripes in the second plurality of stripes.

As an example, if the number of the first plurality of stripes (e.g., all stripes in first storage resource pool 220) is N (N being an even number greater than 2), then N/2 stripes may be determined as the third plurality of stripes, and the number of the corresponding stripes in the second plurality of stripes is also N/2.

In some embodiments, determining a third plurality of stripes includes selecting, among all stripes, a plurality of stripes in odd-numbered rows, and determining the selected plurality of stripes as the third plurality of stripes; or selecting, among all stripes, a plurality of stripes in even-numbered rows, and determining the selected plurality of stripes as the third plurality of stripes.

As an example, the following formula may be used to apply the data shuffle rule to store data of the third plurality of stripes to the corresponding stripes in the second plurality of stripes.

$$S_{islice} = 4M \times W_{data} \times 2^{N_{nest}}$$

For the 1st stripe of the third plurality of stripes:

$$lba_{raid} = lba_{lun} \% \ S_{slice} + S_{rotation} \times (lba_{lun}/S_{slice})$$

For the 2nd stripe of the third plurality of stripes:

$$lba_{raid} = S_{slice} + lba_{lun} \% \ S_{slice} + S_{rotation} \times (lba_{lun}/S_{slice})$$

Similarly, for the nth stripe of the third plurality of stripes:

$$lba_{raid} = n \times S_{slice} + lba_{lun} \% \ S_{slice} + S_{rotation} \times (lba_{lun}/S_{slice})$$

where:

$lba_{lun}$: denotes the stripe rows in the first storage resource pool $lba_{mrg}$: denotes the stripe rows in the second storage resource pool $N_{nest}$: denotes the number of data migrations $S_{slice}$: denotes the size of extents in a stripe $S_{rotation}$: denotes the total number of pieces of migrated data $W_{raid}$: denotes the RAID width $W_{data}$: denotes the width of user data It can be seen that after migrating data using the data shuffle rule, it is possible to enable the extended storage system to use all the I/O access capabilities of the newly added storage devices. Further, since the amount of migrated data may be half that of the existing storage devices, the load is more even. On this basis, it can be understood that if the data I/O access speed of the existing storage system is S, the I/O access speed of the extended storage system can reach 2S. If the conventional data shuffle method is used, the I/O access speed of the extended storage system is still S. Therefore, the method provided in the present disclosure can effectively increase the data access speed (or the bandwidth of data writes/reads) of the storage system.

It will be understood that first storage resource pool 220 is a temporary name for the original plurality of storage devices in the storage system during the extending operation, second storage resource pool 222 is a temporary name for the newly added plurality of storage devices during the extending operation, and these temporary names may be removed after completion of the extending operation.

Figure 5:
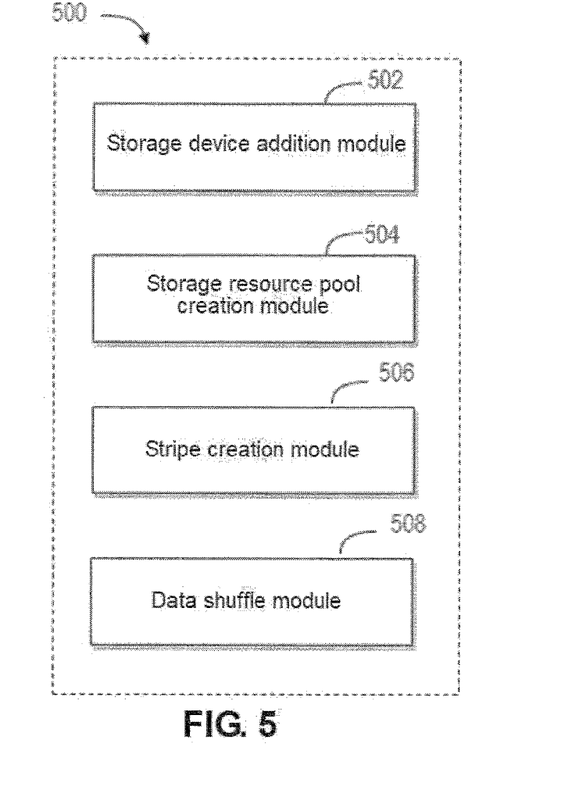
FIG. 5 schematically illustrates a block diagram of an apparatus for extending a storage system according to an example implementation of the present disclosure.

FIG. 5 schematically illustrates a block diagram of apparatus 500 for extending a storage system according to an example implementation of the present disclosure.

Storage device addition module 502 is configured to add, in response to receiving a request to extend the storage system having a first storage resource pool, a second plurality of storage devices to the storage system, wherein the first storage resource pool is generated using a first plurality of storage devices and based on a first storage array standard, the first storage resource pool includes a first plurality of stripes created using the first storage array standard, and the number of the second plurality of storage devices is equal to a first stripe width associated with the first storage array standard.

Storage resource pool creation module 504 is configured to create a second storage resource pool using the second plurality of storage devices and based on a second storage array standard, wherein a second stripe width associated with the second storage array standard is equal to the first stripe width.

Stripe creation module 506 is configured to create a second plurality of stripes in the second storage resource pool using the second plurality of storage devices and based on the second storage array standard.

Data shuffle module 508 is configured to store data of at least one stripe of the first plurality of stripes to a corresponding stripe of the second plurality of stripes according to a data shuffle rule.

Figure 6:
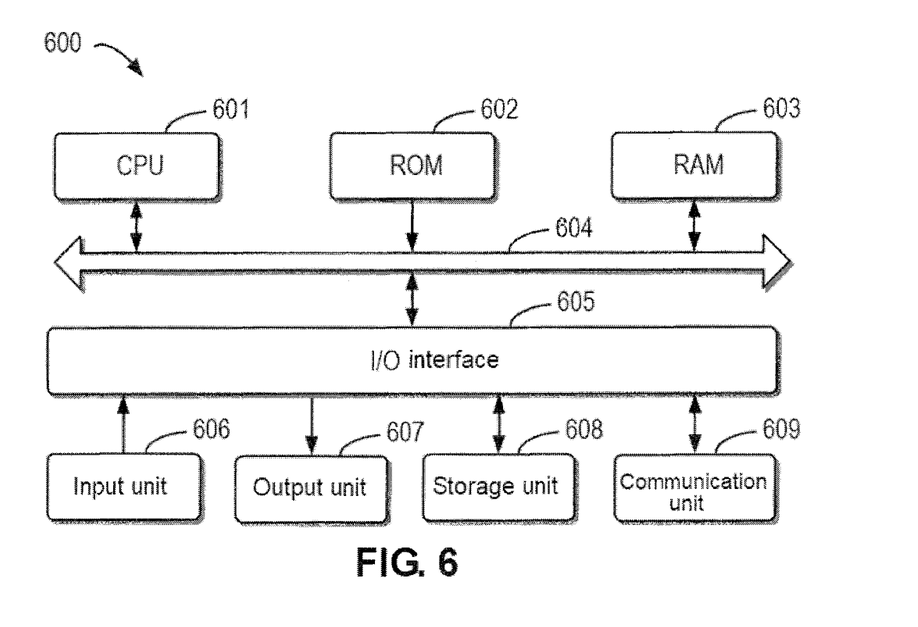
FIG. 6 schematically illustrates a block diagram of a device for extending a storage system according to an example implementation of the present disclosure.

FIG. 6 illustrates a schematic block diagram of device 600 that may be used to implement embodiments of the present disclosure. Device 600 may be a device or apparatus as described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604. Although not shown in FIG. 6, device 600 may also include a co-processor.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by processing unit 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer programs are loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, status setting data, or source code or object code written in any combination of one or more programming languages, including object-oriented programming languages and conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the accompanying drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, including the module, program segment, or part of an instruction including one or more executable instructions for implementing specified logical functions. In some alternative implementations, functions marked in the blocks may also occur in an order different from that marked in the accompanying drawings. For example, two consecutive blocks may in fact be executed substantially concurrently, and sometimes they may also be executed in the reverse order, depending on the functions involved. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various embodiments of the present disclosure have been described above. The foregoing description is illustrative rather than exhaustive, and is not limited to the disclosed various embodiments. Numerous modifications and alterations are apparent to those of ordinary skill in the art without departing from the scope and spirit of the illustrated embodiments. The selection of terms as used herein is intended to best explain the principles and practical applications of the various embodiments or the technical improvements to technologies on the market, or to enable other persons of ordinary skill in the art to understand the embodiments disclosed here.

Some example implementations of the present disclosure are listed below.

In a first aspect of the present disclosure, a method for extending a storage system is provided. This method includes adding a second plurality of storage devices to the storage system in response to receiving a request to extend the storage system having a first storage resource pool, wherein the first storage resource pool is generated using a first plurality of storage devices and based on a first storage array standard, the first storage resource pool includes a first plurality of stripes created using the first storage array standard, and the number of the second plurality of storage devices is equal to a first stripe width associated with the first storage array standard. The method further includes creating a second storage resource pool using the second plurality of storage devices and based on the second storage array standard, wherein the second stripe width associated with the second storage array standard is equal to the first stripe width. The method further includes creating a second plurality of stripes in the second storage resource pool using the second plurality of storage devices and based on the second storage array standard. The method further includes storing data of at least one stripe of the first plurality of stripes to a corresponding stripe of the second plurality of stripes according to a data shuffle rule.

In some embodiments, the method further includes identifying, in response to determining that the data in the at least one stripe has been stored, corresponding storage space in the first storage resource pool as available storage space in the storage system.

In some embodiments, the method further includes releasing the data in the at least one stripe in response to determining that the corresponding storage space is identified as available storage space.

In some embodiments, the first storage array standard and the second storage array standard have a standard based on a redundant array of independent disks (RAID), and the second storage array standard is determined based on the number of the second plurality of storage devices.

In some embodiments, storing data of at least one of the first plurality of stripes to a corresponding stripe of the second plurality of stripes includes determining, based on the first storage array standard, a first plurality of extents of at least one stripe of the first plurality of stripes, wherein the number of the first plurality of extents is equal to the number of the first plurality of storage devices; further includes determining, based on the second storage array standard, a second plurality of extents of at least one stripe of the second plurality of stripes, wherein the number of the second plurality of extents is equal to the number of the second plurality of storage devices; and further includes storing data of the first plurality of extents to the second plurality of extents according to the data shuffle rule.

In some embodiments, the data shuffle rule includes determining a third plurality of stripes among the first plurality of stripes, wherein the number of the third plurality of stripes is half the number of the first plurality of stripes; and further includes storing data in the third plurality of stripes to corresponding stripes in the second plurality of stripes.

In some embodiments, determining a third plurality of stripes includes selecting, among all stripes, a plurality of stripes in odd-numbered rows, and determining the selected plurality of stripes as the third plurality of stripes; or selecting, among all stripes, a plurality of stripes in even-numbered rows, and determining the selected plurality of stripes as the third plurality of stripes.

In a second aspect of the present disclosure, an electronic device is provided. The electronic device includes a processor and a memory coupled to the processor, and the memory has instructions stored therein which, when executed by the processor, cause the device to perform actions. The actions include adding a second plurality of storage devices to the storage system in response to receiving a request to extend the storage system including a first storage resource pool, wherein the first storage resource pool is generated using a first plurality of storage devices and based on a first storage array standard, the first storage resource pool has a first plurality of stripes created using the first storage array standard, and the number of the second plurality of storage devices is equal to a first stripe width associated with the first storage array standard. The actions further include creating a second storage resource pool using the second plurality of storage devices and based on the second storage array standard, wherein the second stripe width associated with the second storage array standard is equal to the first stripe width. The actions further include creating a second plurality of stripes in the second storage resource pool using the second plurality of storage devices and based on the second storage array standard. The actions further include storing data of at least one stripe of the first plurality of stripes to a corresponding stripe of the second plurality of stripes according to a data shuffle rule.

In some embodiments, the actions further include identifying, in response to determining that the data in the at least one stripe has been stored, corresponding storage space in the first storage resource pool as available storage space in the storage system.

In some embodiments, the actions further include releasing the data in the at least one stripe in response to determining that the corresponding storage space is identified as available storage space.

In some embodiments, the first storage array standard and the second storage array standard include a standard based on redundant arrays of independent disks (RAID), and the second storage array standard is determined based on the number of the second plurality of storage devices.

In some embodiments, storing data of at least one of the first plurality of stripes to a corresponding stripe of the second plurality of stripes includes determining, based on the first storage array standard, a first plurality of extents of the at least one stripe of the first plurality of stripes, wherein the number of the first plurality of extents is equal to the number of the first plurality of storage devices; further includes determining, based on the second storage array standard, a second plurality of extents of at least one stripe of the second plurality of stripes, wherein the number of the second plurality of extents is equal to the number of the second plurality of storage devices; and further includes storing data of the first plurality of extents to the second plurality of extents according to the data shuffle rule.

In some embodiments, the data shuffle rule includes determining a third plurality of stripes among the first plurality of stripes, wherein the number of the third plurality of stripes is half the number of the first plurality of stripes; and further includes storing data in the third plurality of stripes to corresponding stripes in the second plurality of stripes.

In some embodiments, determining a third plurality of stripes includes selecting, among all stripes, a plurality of stripes in odd-numbered rows, and determining the selected plurality of stripes as the third plurality of stripes; or selecting, among all stripes, a plurality of stripes in even-numbered rows, and determining the selected plurality of stripes as the third plurality of stripes.

In an embodiment of the third aspect, an apparatus for extending a storage system is provided. The apparatus includes a storage device addition module configured to add a second plurality of storage devices to the storage system in response to receiving a request to extend the storage system including a first storage resource pool, wherein the first storage resource pool is generated using a first plurality of storage devices and based on a first storage array standard, the first storage resource pool has a first plurality of stripes created using the first storage array standard, and the number of the second plurality of storage devices is equal to a first stripe width associated with the first storage array standard. The apparatus further includes a storage resource pool creation module configured to create a second storage resource pool using the second plurality of storage devices and based on a second storage array standard, wherein a second stripe width associated with the second storage array standard is equal to the first stripe width. The apparatus further includes a stripe creation module configured to create a second plurality of stripes in the second storage resource pool using the second plurality of storage devices and based on the second storage array standard. The apparatus further includes a data shuffle module configured to store data of at least one stripe of the first plurality of stripes to a corresponding stripe of the second plurality of stripes according to a data shuffle rule.

In an embodiments of the fourth aspect, a computer-readable storage medium is provided. The computer-readable storage medium has one or more computer instructions stored thereon, which are executed by a processor to implement the method according to the first aspect.

In an embodiment of the fifth aspect, a computer program product is provided. The computer program product includes one or more computer instructions which are executed by a processor to implement the method according to the first aspect.

Although the present disclosure has been described using language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for extending a storage system, comprising:
adding, in response to receiving a request to extend the storage system comprising a first storage resource pool, a second plurality of storage devices to the storage system, wherein the first storage resource pool is generated using a first plurality of storage devices and based on a first storage array standard, the first storage resource pool comprises a first plurality of stripes created using the first storage array standard, and the number of the second plurality of storage devices is equal to a first stripe width associated with the first storage array standard;
creating a second storage resource pool using the second plurality of storage devices and based on a second storage array standard, wherein a second stripe width associated with the second storage array standard is equal to the first stripe width;

creating a second plurality of stripes in the second storage resource pool using the second plurality of storage devices and based on the second storage array standard; and storing data of at least one stripe of the first plurality of stripes to a corresponding stripe of the second plurality of stripes according to a data shuffle rule.

2. The method according to claim 1, further comprising:
identifying, in response to determining that the data in the at least one stripe has been stored, corresponding storage space in the first storage resource pool as available storage space in the storage system.

3. The method according to claim 2, further comprising:
releasing the data in the at least one stripe in response to determining that the corresponding storage space is identified as available storage space.

4. The method according to claim 1, wherein the first storage array standard and the second storage array standard comprise a standard based on a redundant array of independent disks (RAID), and the second storage array standard is determined based on the number of the second plurality of storage devices.

5. The method according to claim 1, wherein storing data of at least one stripe of the first plurality of stripes to a corresponding stripe of the second plurality of stripes comprises:
determining, based on the first storage array standard, a first plurality of extents of at least one stripe of the first plurality of stripes, wherein the number of the first plurality of extents is equal to the number of the first plurality of storage devices;
determining, based on the second storage array standard, a second plurality of extents of at least one stripe of the second plurality of stripes, wherein the number of the second plurality of extents is equal to the number of the second plurality of storage devices; and
storing data of the first plurality of extents to the second plurality of extents according to the data shuffle rule.

6. The method according to claim 1, wherein the data shuffle rule comprises:
determining a third plurality of stripes among the first plurality of stripes, wherein the number of the third plurality of stripes is half the number of the first plurality of stripes; and
storing data in the third plurality of stripes to a corresponding stripe in the second plurality of stripes.

7. The method according to claim 6, wherein determining the third plurality of stripes comprises:
selecting, among all stripes, a plurality of stripes in odd-numbered rows, and determining the selected plurality of stripes as the third plurality of stripes; or
selecting, among all stripes, a plurality of stripes in even-numbered rows, and determining the selected plurality of stripes as the third plurality of stripes.

8. An electronic device, comprising:
a processor; and
a memory coupled to the processor, wherein the memory has instructions stored therein, and the instructions, when executed by the processor, cause the device to execute actions comprising:
adding, in response to receiving a request to extend the storage system comprising a first storage resource pool, a second plurality of storage devices to the storage system, wherein the first storage resource pool is generated using a first plurality of storage devices and based on a first storage array standard, the first storage resource pool comprises a first plurality of stripes created using the first storage array standard, and the number of the second plurality of storage devices is equal to a first stripe width associated with the first storage array standard;
creating a second storage resource pool using the second plurality of storage devices and based on a second storage array standard, wherein a second stripe width associated with the second storage array standard is equal to the first stripe width;
creating a second plurality of stripes in the second storage resource pool using the second plurality of storage devices and based on the second storage array standard; and
storing data of at least one stripe of the first plurality of stripes to a corresponding stripe of the second plurality of stripes according to a data shuffle rule.

9. The electronic device according to claim 8, wherein the actions further comprise:
identifying, in response to determining that the data in the at least one stripe has been stored, corresponding storage space in the first storage resource pool as available storage space in the storage system.

10. The electronic device according to claim 9, wherein the actions further comprise:
releasing the data in the at least one stripe in response to determining that the corresponding storage space is identified as available storage space.

11. The electronic device according to claim 8, wherein the first storage array standard and the second storage array standard comprise a standard based on a redundant array of independent disks (RAID), and the second storage array standard is determined based on the number of the second plurality of storage devices.

12. The electronic device according to claim 8, wherein storing data of at least one stripe of the first plurality of stripes to a corresponding stripe of the second plurality of stripes comprises:
determining, based on the first storage array standard, a first plurality of extents of at least one stripe of the first plurality of stripes, wherein the number of the first plurality of extents is equal to the number of the first plurality of storage devices;
determining, based on the second storage array standard, a second plurality of extents of at least one stripe of the second plurality of stripes, wherein the number of the second plurality of extents is equal to the number of the second plurality of storage devices; and
storing data of the first plurality of extents to the second plurality of extents according to the data shuffle rule.

13. The electronic device according to claim 8, wherein the data shuffle rule comprises:
determining a third plurality of stripes among the first plurality of stripes, wherein the number of the third plurality of stripes is half the number of the first plurality of stripes; and
storing data in the third plurality of stripes to a corresponding stripe in the second plurality of stripes.

14. The electronic device according to claim 13, wherein determining the third plurality of stripes comprises:
selecting, among all stripes, a plurality of stripes in odd-numbered rows, and determining the selected plurality of stripes as the third plurality of stripes; or
selecting, among all stripes, a plurality of stripes in even-numbered rows, and determining the selected plurality of stripes as the third plurality of stripes.

15. An apparatus for extending a storage system, comprising:

a storage device addition module configured to add, in response to receiving a request to extend the storage system comprising a first storage resource pool, a second plurality of storage devices to the storage system, wherein the first storage resource pool is generated using a first plurality of storage devices and based on a first storage array standard, the first storage resource pool comprises a first plurality of stripes created using the first storage array standard, and the number of the second plurality of storage devices is equal to a first stripe width associated with the first storage array standard;

a storage resource pool creation module configured to create a second storage resource pool using the second plurality of storage devices and based on a second storage array standard, wherein a second stripe width associated with the second storage array standard is equal to the first stripe width;

a stripe creation module configured to create a second plurality of stripes in the second storage resource pool using the second plurality of storage devices and based on the second storage array standard; and a data shuffle module configured to store data of at least one stripe of the first plurality of stripes to a corresponding stripe of the second plurality of stripes according to a data shuffle rule.

16. A computer program product having a non-transitory computer readable medium which stores a set of instructions to extend a storage system; the set of instructions, when carried out by computerized circuitry, causing the computerized circuitry to perform a method of:

adding, in response to receiving a request to extend the storage system comprising a first storage resource pool, a second plurality of storage devices to the storage system, wherein the first storage resource pool is generated using a first plurality of storage devices and based on a first storage array standard, the first storage resource pool comprises a first plurality of stripes created using the first storage array standard, and the number of the second plurality of storage devices is equal to a first stripe width associated with the first storage array standard;

creating a second storage resource pool using the second plurality of storage devices and based on a second storage array standard, wherein a second stripe width associated with the second storage array standard is equal to the first stripe width;

creating a second plurality of stripes in the second storage resource pool using the second plurality of storage devices and based on the second storage array standard; and storing data of at least one stripe of the first plurality of stripes to a corresponding stripe of the second plurality of stripes according to a data shuffle rule.

* * * * *